JAMES A.T. FRENCH,
INVENTOR

By Hall & Houghton
ATTORNEY

JAMES A.T. FRENCH,
INVENTOR

By Hall & Houghton
ATTORNEY

TIME DIVISION MULTIPLEX COMMUNICATION SYSTEMS

Filed July 18, 1960 3 Sheets-Sheet 3

JAMES A. T. FRENCH,
INVENTOR
BY Hall & Houghton
ATTORNEY.

United States Patent Office 3,100,243

Patented Aug. 6, 1963

3,100,243

TIME DIVISION MULTIPLEX COMMUNICATION SYSTEMS

James Alfred Thomas French, Kenton, England, assignor to Her Majesty's Postmaster General, London, England Filed July 18, 1960, Ser. No. 43,461
Claims priority, application Great Britain July 24, 1959
5 Claims. (Cl. 179—15)

Figure 1:
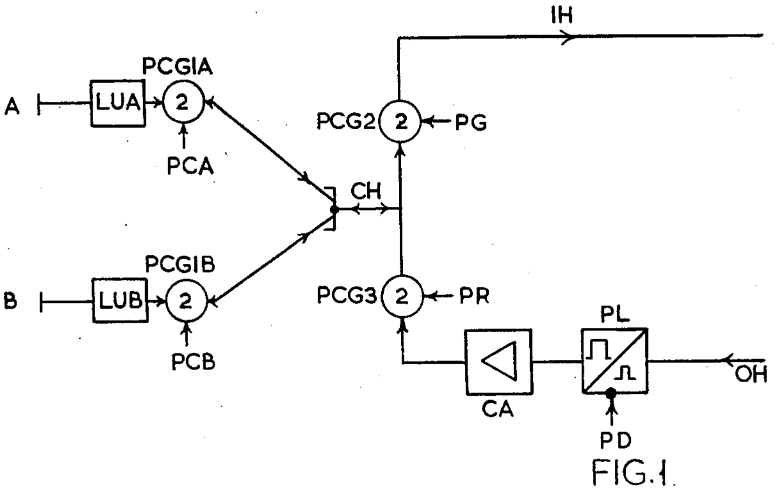

This invention relates to time division multiplex (T.D.M.) communication systems and in particular to a telephone exchange switching system in which exchange lines for example subscribers' telephone lines or junction lines, are interconnected via a highway or highways common to a plurality of lines, the signals on the highway or highways being in the form of amplitude modulated pulses suitably spaced in time.

In such a system connection between an exchange line and a T.D.M. transmission system may be made via either a two-wire circuit or a four-wire circuit.

When a four-wire circuit is used each exchange line is terminated in a balanced hybrid transformer having a suitable balancing impedance. The transformer is connected via a modulator gate to a Go highway for sent signals. The transformer is also connected to a Return highway for received signals via a low pass filter and a demodulator gate. The method has the advantages that pulse power on the highways and in pulse gates interconnecting highways can be low. As incoming signals from each line and outgoing signals to each line are on separate highways, mutual interference is avoided and any loss in the exchange switches can be made up by amplification of signals sent from the Return highway to a line.

When using a two-wire circuit each telephone line may be terminated in a low-pass filter which is connected via a single bothway gate (hereinafter defined as a gate capable of efficient transmission of both send and received signals) to a single highway for both sent and received signals. Advantages of this method are that the line circuit is cheap, having only one bothway gate and no hybrid transformer or amplifier. Disadvantages are that there is a small loss which, as no amplification can be used, cannot easily be made up and that signals sent from exchange to line and received from line in the exchange cannot easily be separated because of the use of a common highway for both sent and received signals. Also a higher power rating for gating elements interconnecting highways is required.

It is an object of the present invention to provide in a T.D.M. communication system improved apparatus for converting a two-wire line circuit to a four-wire exchange circuit.

In a telephone exchange switching system embodying the invention a subscriber's line has line unit apparatus which is connected via a bothway gate to a common highway associated with a plurality of such subscribers' lines. Each subscriber's line is associated with a cyclically recurring channel pulse and is connected to its common highway for the duration of each channel pulse.

The line circuit apparatus of the two-wire T.D.M. transmission circuit includes an integrating device, usually in the form of a low pass filter which is terminated at the line end in such manner as to have the property that the voltage response to a pulse applied to the end which is connected to the bothway gate decays to approximately zero in the interval between one pulse and the next of a train of pulses used for one communication channel.

The precise nature of this response depends upon the filter design and for this application the optimum design is achieved when this voltage response is in fact zero at the end of each successive interval between pulses. Thus, if a signal at the bothway gate is sampled at the ends of these intervals it will contain very little, if any, component due to a signal transmitted from the T.D.M. common highway to the line circuit on the previously occurring pulses. It will, however, contain the signal originating from the line circuit and required to be transmitted to the common highway. However in order to achieve conversion from the two-wire line circuit to a four-wire exchange circuit it is necessary to separate presently occurring pulses transmitting a signal from the common highway to a line circuit from an incoming signal from a line circuit, which is sampled at the end of the interval between pulses, in order to provide separate highway paths for sent and received signals.

According to the present invention a time division multiplex communication system includes a plurality of exchange line equipments each connected via a different two-way pulse gate to a two-wire highway common to all of the exchange line equipments, each two-way pulse gate being further connected to a source of cyclically recurring channel pulses, and apparatus for converting the two-wire highway to a four-wire circuit having a Go highway and a Return highway, the apparatus comprising first gating means connected between the two-wire highway and the Go highway, the first gating means being arranged to be opened recurrently for the duration of first gating pulses which occur during an initial part only of each channel pulse, the Return highway including pulse lengthening means connected to the two-wire highway, the pulse lengthening means operating to retime the duration of a signal pulse from the Return highway in such manner that it coincides only with that part of a channel pulse following a first gating pulse, and means for establishing communication between the Go and Return highways.

The pulse lengthener advantageously may provide voltage gain for signal pulses on the Return highway. Conveniently the Return highway may also include current amplifying means for amplifying lengthened signal pulses; the current amplifying means may comprise a push-pull transistor amplifier.

In one embodiment of the invention the two-wire highway may be connected to the pulse lengthener via second gating means arranged to be opened recurrently for the duration of second gating pulses which occur only during that portion of each of the channel pulses following the first gating pulses.

The second gating means may comprise a transistor push-pull current amplifier which is controlled by the second gating pulses in such manner that the amplifier is able to conduct only in the presence of a said second gating pulse.

The exchange line equipments may include subscribers' line unit equipments each of which conveniently may be terminated in a low-pass filter whose final element is capacitative. Conveniently the two-way pulse gate may comprise a symmetrical transistor.

Figure 2:
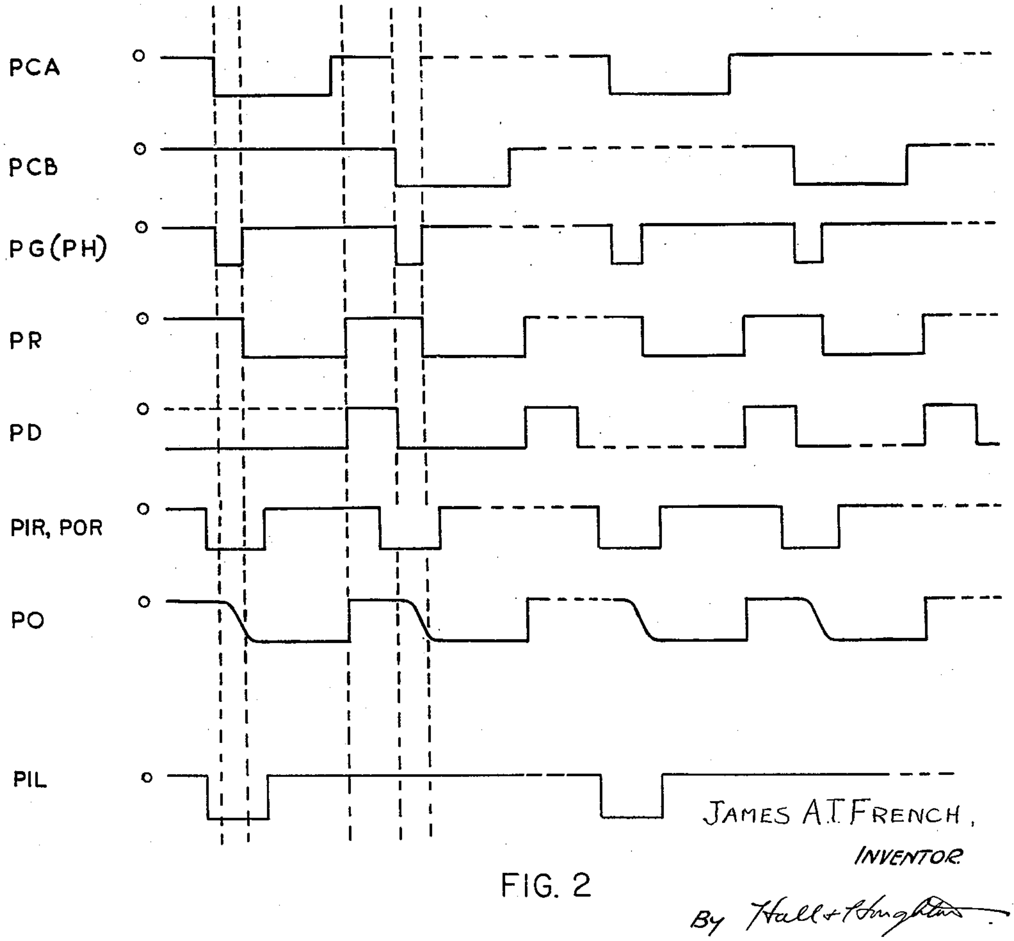
Figure 3A:
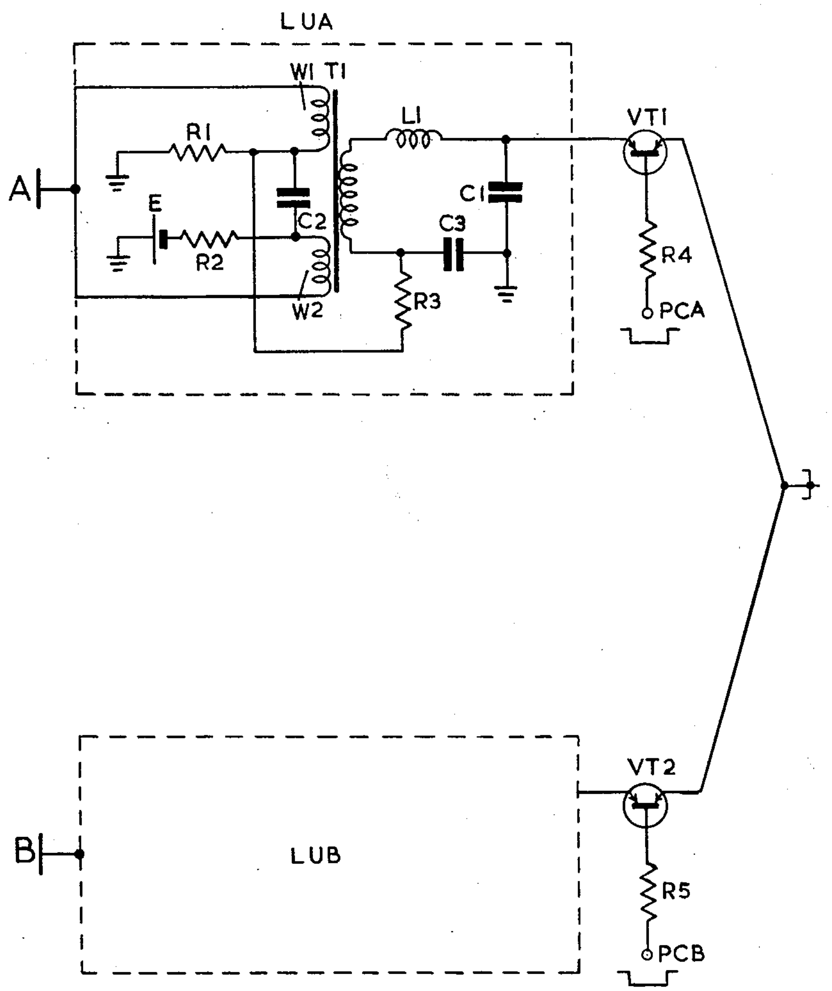
Figure 3B:
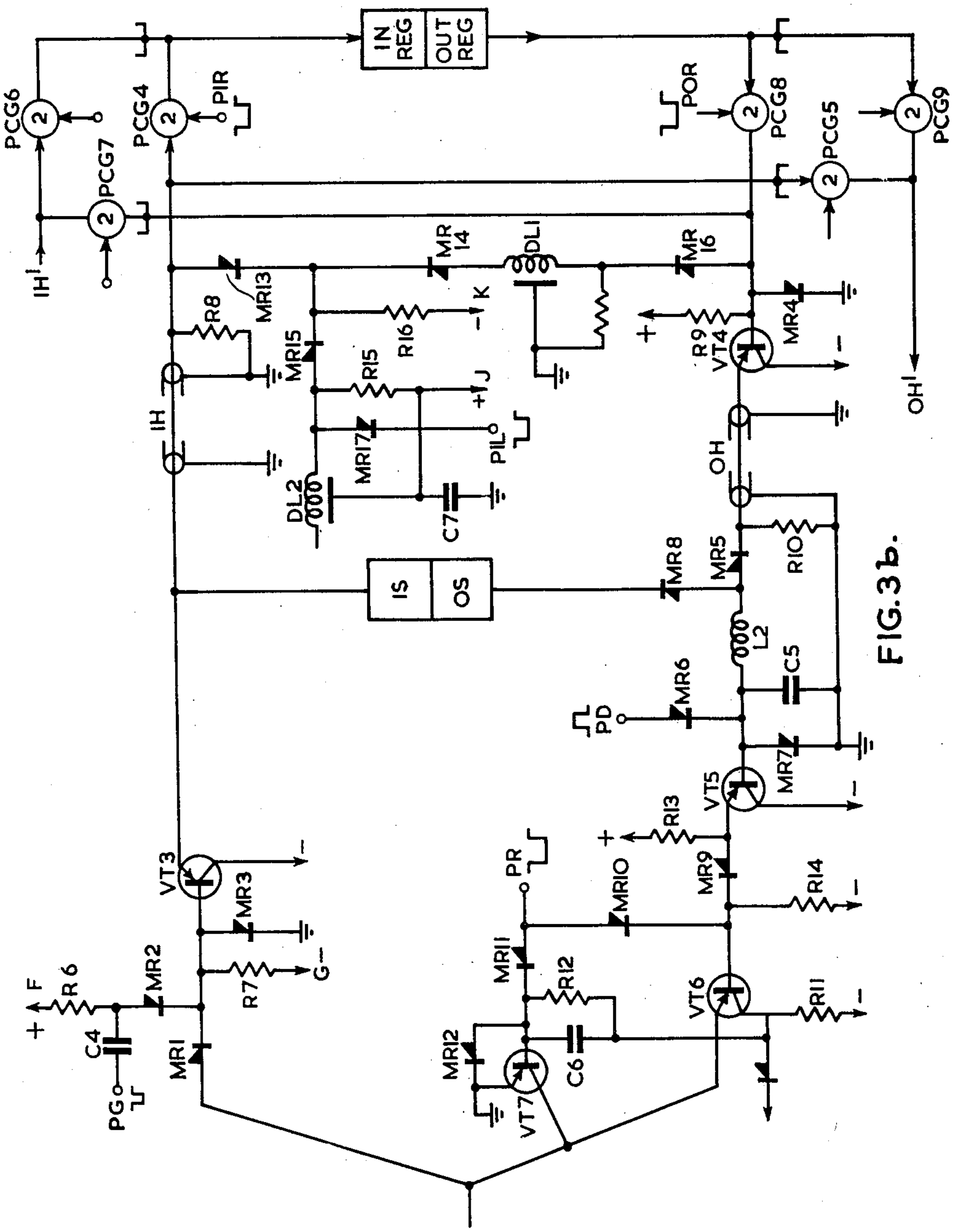

By way of example embodiments of the invention will now be described in greater detail and with reference to the accompanying drawings in which, FIGURE 1 shows in block schematic form elements of a circuit embodying the invention, FIGURE 2 shows pulse waveforms used in operation of the circuit shown in FIGURES 1, 3*a* and 3*b*, and FIGURES 3*a* and 3*b* show a circuit diagram of part of a telephone exchange switching system embodying the invention.

FIGURE 1 shows in block schematic form a circuit for conversion between a two-wire circuit and a four-wire circuit in a telephone exchange switching system. Two subscribers' telephone lines A and B, of a number of such lines, are shown each connected via respective line unit apparatus LUA, LUB and bothway gates PCG1A, PCG1B to one end of a two-wire T.D.M. common highway CH in a telephone exchange. The other end of common highway CH is connected to a four-wire circuit comprising a Go highway IH and a Return highway OH. Connection to the Go highway is via a one-way pulse coincidence gate PCG2 controlled by a source of pulses PG whilst connection to the Return highway is via a one-way pulse coincidence gate PCG3 controlled by a source of pulses PR. The Return highway includes a pulse lengthener PL and a current amplifier CA which makes up any losses in signals transmitted from line through the exchange switches.

Subscriber's line A is connected with the common highway CH via bothway gate PCG1A for the duration of a cyclically recurring channel pulse PCA. Subscriber's line B is similarly connected via bothway gate PCG1B for the duration of channel pulses PCB displaced in time relative to pulses PCA. The relative timing of these pulses is shown in FIGURE 2.

Common highway CH is connected via gate PCG2 to Go highway IH for the duration of a cyclically recurring pulse PG. Pulse PG occurs at the beginning of each channel pulse PC and occupies only an initial period of each channel pulse, this period being short compared with the duration of a channel pulse. Common highway CH is also connected via gate PCG3, to the Return highway OH for the duration of a cyclically recurring pulse PR. Pulse PR occupies the subsequent period of a channel pulse not occupied by a pulse PG. The relative timing of pulses PCA, PCB, PG and PR is shown in FIGURE 2.

Thus a signal from, say, line A and modulating a channel pulse PCA can be transmitted to highway IH via common highway CH and gate PCG2 during the period of a pulse PG coinciding with the initial portion of a channel pulse PCA whilst a signal on Return highway OH is delayed by pulse lengthener PL and may be transmitted to line A during the period of a channel pulse PCA coincident with pulse PR. Interference between signals passing from line to exchange and transmitted from exchange to line is thereby avoided.

Subscribers A and B form part of a group of subscribers to all of whom highway CH is common. Normally there will be other groups of subscribers and other exchange lines each having a common highway corresponding to CH and joined to Go and Return highways in similar manner. The Go and Return highways of the various groups are interconnected, methods of making such interconnections being described in British patent specifications No. 781,561 and No. 777,933.

Each pulse transmitted over the Go and Return highways is derived from a pulse PG and is short in duration compared with a channel pulse PC. Thus crosstalk between adjacent channels and the signal power required to be transmitted in the highways and highway gates is reduced.

Pulse lengthener PL produces from short highway pulses, such as PH in FIG. 2, a pulse of the form shown by PO in FIG. 2 which overlaps a PR pulse. A pulse PD occurring between channel pulses PC is used to discharge the pulse lengthener PL. The signal power transmitted from Return highway OH to common highway CH, and hence to line, is proportional to the duration of the pulse transmitted during the period of pulse PR. Thus the use of a pulse lengthener, as PL, in the return highway enables a higher power level signal to be transmitted than when a pulse lengthener is not employed.

The integrating device necessary in the line unit apparatus provides storage in the intervals between channel pulses for the signal received from line and the signal to be transmitted to line. The integrating device is normally in the form of a low pass filter capacitatively terminated at the bothway gate. This capacitative termination may take the form of a delay line with a total capacitance C and characteristic impedance RO having a delay time (CRO) equal to half the channel pulse length. The delay line may be built up of lumped elements. Alternatively the delay line may be reduced to a single capacitor C and series inductor L such that the time of half of a cycle of the resonant frequency of L and C is equal to the length of a channel pulse. However, the simplest and cheapest efficient termination is a capacitor C by itself which is charged or discharged via its associated bothway gate PCG1A, or PCG1B, and common highway CH to the voltage appearing at the low impedance output of amplifier CA terminating the Return highway.

Within the period of each channel pulse PC it is first necessary to sample the voltage across capacitor C during the period of pulse PG and transmit a pulse of the same or proportional amplitude to the Go highway IH; secondly it is necessary to remove from capacitor C the charge accumulated due to the signal from line; thirdly the signal from Return highway OH, after pulse lengthening or delaying and amplification, must be transferred to capacitor C during the period of pulse PR. The second requirement may be accomplished either wholly during PG, wholly during PR, or partly during PG and partly during PR. Assuming that the Return highway pulse is lengthened by pulse lengthener PL so that it overlaps pulse PR, then the lengths of pulses PG and PR are determined chiefly by the peak power required to be transmitted and the voltage and current limits for the pulse gates.

The power which may be transmitted by a pulse gate is proportional to the product of the peak inverse voltage $V_p$, with respect to the pulse source, the peak current $I_p$ which the gate can pass, the duration $t_p$ of each pulse and the repetition frequency $f_p$ of the pulses. If a pulse gate is operated at its voltage and current limits and $f_p$ is fixed then the permissible power transfer is proportional to the pulse length $t_p$.

In certain circumstances it is desirable to make PR long enough to permit the full peak power transfer to take place in either direction during the period of PR. The charge in capacitor C due to the signal from line is then reduced very little during the period of sampling pulse PG but is transferred to the terminating impedance of amplifier CA during the pulse PR and destroyed. It is desirable to make PG short so as to obtain the minimum channel pulse length. However, transmission delay through the highways of a switching system, which may amount to several tenths of a micro-second, will provide a gap between the start of both a channel pulse PC and a sampling pulse PG and the arrival of a lengthened pulse at the output of amplifier CA, which gap the pulse PG could conveniently fill. Further if the impedance of the line unit terminal capacitor C and that of amplifier CA output circuit are such that the initial change in the voltage of C is slow, then PCG3 and gating pulse PR could be omitted without risk of interference between a signal passing from common highway CH to Go highway IH and a signal being transmitted to line from Return highway OH.

FIGURES 3a and 3b show the circuit diagram of speech paths of a practical telephone exchange switching system using a two-wire multiplex with four-wire highways, and a short pulse on the highways. The circuit relates to a switched-highways type of exchange with common supervisory and register apparatus working on a T.D.M. basis.

Subscribers' lines A and B are shown in the circuit, these lines terminating in the exchange in line unit equipment, part of that for line A being shown at LUA and part of that for line B shown at LUB, the latter being identical to LUA. In the line unit apparatus a transformer T1 couples the balanced line circuit to an unbalanced filter and a bothway gate VT1, the gate being in the form of a symmetrical transistor switched by a source of pulses PC. The filter shown comprises elements L1 and C1 in the simplest possible arrangement but may require additional elements to meet the design requirements mentioned previously. A D.C. signal received by the line circuit is dissipated in resistor R3 which is by-passed at audio frequencies by capacitor C3. Current from a common battery E is fed to line via equal resistors R1 and R2 (to maintain the balance condition) and via the line side windings W1, W2 of transformer T1. Current flow through resistors R1 and R2 and battery E due to an A.C. signal is prevented by by-pass capacitor C2 which couples windings W1 and W2. The voltage produced across R1 by a subscriber's loop condition applies a D.C. hold signal to bothway gate VT1 in series with resistor R3. This voltage may be limited by a diode clamp, if necessary, to permit line current variations.

It is arranged that no D.C. component of current due to D.C. hold signals ingoing to and outgoing from the exchange flows in a bothway gate such as VT1, VT2 in the speaking condition. Besides requiring minimum power to be transmitted by the gate this technique also removes the channel pulse repetition frequency components applied to the line unit filter, leaving only sidebands when speech is present, so that attenuation needed in the filter is a minimum.

The bothway gates VT1, VT2 are shown as symmetrical transistors. These transistors are controlled by sources of channel pulses PCA, PCB respectively and require less pulse current to operate them than does a diode bridge circuit since the transistors provide a useful current gain.

Exact equality in the current gains with the two emitters of each transistor VT1, VT2 is not necessary and in practice it may be advantageous to have approximately double the current from the emitter connected to the line unit filter capacitor C1 since this permits a tone calling signal superimposed on a D.C. component to be transmitted to a subscriber's instrument. A negative going channel pulse PCA applied through resistor R4 controls bothway gate VT1 whilst a similar channel pulse PCB, displaced in time relative to pulse PCA, applied through resistor R5 controls bothway gate VT2.

A diode rectifier may be connected across resistor R4 so that the base of transistor VT1 is quickly made positive on cessation of a negative going channel pulse, thereby reducing the effects of hole storage in the transistor.

The two-wire multiplex common highway CH is connected to Go highway IH via a diode gate circuit comprising MR1, MR2 and MR3 to which gating pulse PG is applied via capacitor C4. In the absence of pulse PG current flowing in resistor R6 and diode MR2 from a positive supply F is greater than that flowing in resistor R7 to negative supply G and the difference current flows in diode MR3 and maintains the base of emitter-follower transistor VT3 slightly positive with respect to its emitter. Both transistor VT3 and diode MR1 are non-conducting. When pulse PG is applied, diode MR2 is cut off and current through resistor R7 flows in the base of transistor VT3 clamping its potential via diode MR1 to the voltage across the terminal capacitor C1 of a line unit whose bothway gate has a channel pulse applied to it. An amplitude modulated pulse is thus sent over Go highway IH, which may comprise a coaxial cable terminated in a resistor R8.

The Go highway is connected to apparatus IS for detecting incoming supervisory signals such as calling, answering and clearing signals etc. It is also connected to a register REG via gate PCG4 and to Return highways of other groups via gates, such as PCG5 for Return highway OH'. Go highway IH is further connected to Return highway OH via a within group link to be described later. Supervisory apparatus suitable for use with the system illustrated in FIGURE 3 is described in British patent specification No. 796,223, whilst the register may be of the form described in British patent specification No. 804,691.

Incoming highways from other groups are also connected via gates to the register and to Return highway OH, for example Go highway IH' is connected to the register REG via gate PCG6 and to Return highway OH via gate PSG7.

The Return highway OH contains a coaxial cable link similar to that on the Go highway IH. This consists of emitter-follower transistor VT4, whose base is normally positively biassed by current from a positive supply H through resistor R9 and diode MR4 to make it non-conducting; the cable is terminated in resistor R10. Negative going pulses are applied to the base of transistor VT4 via either inter highway gates, such as PCG7 or the within-group link circuit previously mentioned. These pulses are reproduced across resistor R10.

The Return highway also includes a pulse lengthener comprising diode MR5, inductor L2 and capacitor C5, this pulse lengthener producing across C5, from a highway pulse such as PH, a pulse of the form PO shown in FIGURE 2. The values of L2 and C5 are chosen such that the time of half a cycle at the resonant frequency of L2 and C5 is equal to the length of a pulse PG. When a pulse appears across R10, current flows in MR5 and L2 to charge C5 in an oscillatory manner, in the ideal case, to twice the voltage of the pulse across R10. When the oscillatory current in L2 passes through zero, diode MR5 is cut off and current ceases to flow leaving C5 charged. Capacitor C5 is discharged during gaps between channel pulses by a discharge pulse PD and a diode clamp comprising diode MR6 and MR7.

Outgoing supervisory signals are fed to the pulse lengthener at L2 from apparatus OS vis diode MR8. The voltage across C5 is applied via an emitter-follower transistor VT5 and a diode gate MR9 and MR10 to a push-pull current amplifier, comprising transistors VT6 and VT7, which reproduces the voltage across C5 and transmits it to the two-wire multiplex highway CH.

A pulse PR is applied to diode MR10 and also to a diode clamp MR11, MR12. The off condition of PR is slightly positive so that the bases of both transistors VT6 and VT7 are biassed positively and the transistors cut off. This isolates common highway CH from Return highway OH during the period of sampling pulse PG and is equivalent to the gate PCG3 shown in FIGURE 1. For the remainder of a channel pulse PR is a negative pulse which backs off diodes MR10 and MR11 allowing both transistors VT6 and VT7 to conduct. The base of transistor VT6 assumes the potential at capacitor C5 and either transistor VT6 or VT7 conducts and draws current from a line unit filter capacitor C1 or feeds current into the capacitor C1 depending upon whether the voltage on capacitor C1 at the beginning of the channel pulse is less negative or more negative respectively than the voltage on capacitor C5.

Whilst transistor VT6 conducts, its collector current passing through R11 produces a voltage drop which is applied via a large capacitor C6 to the base of transistor VT7, holding the latter cut off. Whilst transistor VT6 is cut off, transistor VT7 is held conducting with current drawn out of its base through capacitor C6 and resistor R11. When line unit filter capacitor C1 is charged to the same potential as capacitor C5, both transistors VT6 and VT7 pass a small current, this being limited by the voltage drop across resistor R11 being fed back to the base of transistor VT7. At the end of pulse PR, firstly transistor VT6 is cut off on its base and then transistor VT7 cut off.

At the end of a pulse PR, transistor VT6 will be cut off first and the resultant base current in transistor VT7 will cause this latter transistor to conduct whilst the pulse PR decays to its zero value, just positive to earth.

Channel pulses, such as PCA, are timed to end slightly before their associated pulses PR end and thus, after cessation of a channel pulse, a short pulse of current flows from common highway CH, via transistor VT7, to earth, thereby discharging the common highway CH.

High pulse currents in the collector of transistor VT6 flow through capacitor C6 and diode MR12 to earth and tend to discharge capacitor C6. Small pulse currents in the base of transistor VT7 tend to charge capacitor C6 as does current via diode MR11 from the source of pulses PR. Capacitor C6 draws sufficient current from this latter source to maintain its charge. Resistor R12 across capacitor C6 ensures that this capacitor will not charge up so much as to prevent transistor VT7 conducting when there are no pulses on the Return highway OH to make VT6 conduct.

The charging current for the line unit filter capacitor C1 during pulse PR may be limited either by the current which the bothway gate transistor VT1, VT2 will pass, or by the current which can be supplied by transistors VT6 and VT7.

With no loop on a subscriber's exchange line, such as A, its associated capacitor C1 is at earth potential; with no outgoing hold signal applied, rectifier MR9 is also at earth potential. Thus, during a channel pulse, practically no current flows in any of transistors VT1, VT6 and VT7.

When a loop is applied to this exchange line A, a voltage is developed across resistor R1, applying an incoming D.C. hold signal to the bothway gate VT1 in series with resistor R3, and the potential of capacitor C1 rises, between channel pulses, to this voltage. With no outgoing hold signal applied, rectifier MR9 remains at earth potential so that capacitor C1 is discharged to zero via transistors VT1 and VT7 during the portion of a channel pulse PCA coinciding with a pulse PC. Meanwhile, the incoming D.C. hold signal is transmitted on a highway IH during the period of a channel pulse PCA coinciding with a pulse PG.

When a connection has been set up, an outgoing hold signal, of the same value as the incoming D.C. hold signal, is applied to rectifier MR9 during the channel pulse concerned. Thus, once again, no current flows in transistors VT1, VT6 or VT7 during a channel pulse when no modulating signal is present.

Thus, in the absence of speech there is no change of charge on capacitor C1 during channel pulses PCA and there is no channel pulse repetition frequency component in the line circuit.

When a modulating signal is superimposed on the outgoing hold signal applied to rectifier MR9, capacitor C1 is charged to the resultant voltage via bothway gate VT1 and either transistor VT6 or VT7 during the portion of a channel pulse PCA coinciding with a pulse PR.

The Return highway is connected to an outgoing register OUT REG via gate PCG8. Return highways are also connected via gates to the outgoing register e.g. highway OH′ is connected via gate PCG9.

An incoming connection to the exchange from say, line A, is set up to a register IN REG by applying a pulse PIR, corresponding to the channel pulse PCA used in gate VT1, to the gate PCG4. An outgoing register connection to the same line circuit uses a pulse POR applied to gate PCG8 and corresponding to the same channel pulse.

A connection between the Go highway IH of one group and the Return highway, such as OH′, of another group is made via a gate, such as PCG5 for highway OH′; a corresponding connection between Go highways IH′ and Return highway OH is made via gate PCG7, to each of which is applied a pulse corresponding in time to the channel pulse used for the connections between the calling and called circuit and the highways of their respective groups.

In FIGURE 2 the timing of the pulses shown all refer to a connection from subscriber's line A or to subscriber's line A.

The circuitry required for establishing connection between two subscribers in the same group, for example between subscriber A and subscriber B, will now be described with reference to FIGURES 3*a* and 3*b*.

Go highway IH is connected via a diode gate comprising diodes MR13, MR14, MR15, a unit channel pulse period delay line DL1 and decoupling diode MR16 to a transistor VT4 driving the Return highway OH. The junction of diodes MR13 and MR14 is normally held at earth potential with current flowing from a positive supply voltage J, by-passed to earth by capacitor C7, via resistor R15, diode MR15 and resistor R16 to a negative voltage supply K. Resistor R15 acts as the terminating resistor for a half-channel pulse period delay line DL2 which is open circuited at its other end.

In order to establish a connection between for example a subscriber A and subscriber B, control apparatus associated with the register provides three adjacent but different channel pulses. Apparatus suitable for selecting the three adjacent channel pulses is described in British patent specification No. 826,631. Assuming that A is the calling subscriber, the first and third occurring channel pulses are allotted to subscriber A and the second occurring channel pulse to subscriber B. A negative going pulse PIL, corresponding to the first of the three channel pulses is applied via diode MR17 to resistor R15 cuts off diode MR15 causing the signal voltage from subscriber A and appearing on Go highway IH to be applied to the unit delay line DL1 and to appear on Return highway OH during the following channel pulse period i.e., during the period in which subscriber B is connected to the system by the second occurring channel pulse. Half unit delay line DL2 is charged during the period of pulse PIL and discharges into resistor R15 during the period of the second channel pulse so that diode MR15 is also cut off for the duration of the second occurring channel pulse. A signal pulse from subscriber B appearing on the Go highway IH will thus be transmitted via delay line DL1 to appear on the Return highway OH during the period of the third occurring channel pulses. A signal thus passes from subscriber B to subscriber A.

Instead of the method described above for establishing a within group connection other methods may be used. For example a link circuit containing a demodulator and a modulator may be connected between highway IH and highway OH, with an input and an output gate and appropriate storage for gating pulses in order to connect a circuit using one channel pulse to another circuit using any other channel pulse. In general two links are required for the two directions of transmission for each within group connection although under certain conditions it is possible to use the same link path for the two directions of transmission.

I claim:

1. In a time division multiplex communication system, a plurality of lines, individual terminal equipments for lines, a two-wire highway common to the plurality of lines, individual two-way pulse gates connected to one end of the common two-wire highway for selectively establishing communication between said terminal equipments and the common two-wire highway, means for allotting each two-way pulse gate an individual time position within a recurring cycle of time positions, a source of channel pulses for supplying enabling channel pulses to respective two-way pulse gates during their allotted time positions, each channel pulse having a relatively short initial portion and a relatively long subsequent portion, an incoming two-wire highway connected to the other end of the common two-wire highway, an outgoing two-wire highway, first one-way pulse gating means connecting the said other end of the common two-wire highway and the outgoing two-wire highway, a source of first gating pulses connected to the first one-way gating means, the first gating pulses timed to coincide with the said initial portions of respective channel pulses, voltage amplifying pulse lengthening means connected between the incoming highway and the said other end of the common two-wire highway, the pulse lengthening means providing a delay at least equal to the duration of the said initial portion of a channel pulse.

2. In a time division multiplex communication according to claim 1, a second one-way pulse gating means connected between the pulse delay means and the said other end of the common two-wire highway, and a second source of gating pulses connected to the second one-way pulse gating means, the gating pulses from the second source timed to occur during the said subsequent portions of respective channel pulses.

3. In a time division multiplex communication system, a plurality of lines, a plurality of low-pass filters, a separate shunt capacitive element terminating each low-pass filter, the low-pass filters forming terminating means for respective lines, a two-wire highway common to the plurality of lines, individual two-way pulse gates connected between said terminating means and one end of the common two-wire highway, means for allotting each two-way pulse gate an individual time position within a recurring cycle of time positions, a source of channel pulses for supplying enabling pulses to respective two-way pulse gates during their allotted time positions, the said channel pulses having relatively short initial portions and relatively long subsequent portions, an outgoing two-wire highway, a first one-way pulse gate connecting the other end of the common two-wire highway and the outgoing two-wire highway, a source of first gating pulses connected to the first one-way pulse gate, said first gating pulses timed to coincide with the said initial portions of respective channel pulses, an ingoing two-wire highway, voltage amplifying pulse lengthening means having an input and an output, the pulse lengthening means arranged to provide a delay at least equal to the duration of the said initial portion of a channel pulse, the pulse lengthening means input connected to the incoming two-wire highway, first and second transistors arranged as a push-pull current amplifier, input and output terminals for the push-pull amplifier, a second one-way pulse gate connected between the pulse lengthening means output and the push-pull amplifier input terminal, the output terminal of the push-pull amplifier connected to the said other end of the common two-wire highway, and a source of second gating pulses connected to the second one-way pulse gate to provide an enabling bias for the first and second transistors, the second gating pulses timed to coincide with the said subsequent portions of respective channel pulses.

4. In a time division multiplex communication system according to claim 3, in which the said first transistor is adapted to conduct during a second gating pulse only if an input pulse applied to the push-pull amplifier input terminal has a magnitude relatively greater than that of a voltage across the said capacitor terminating the low-pass filter of a line then connected to the ingoing two-wire highway, and the said second transistor is adapted to conduct during a second gating pulse only if an input pulse applied to the push-pull amplifier terminal has a magnitude relatively smaller than that of a voltage across the said capacitor terminating the low-pass filter of a line then connected to the ingoing two-wire highway.

5. In a time division multiplex communication system according to claim 3, the said second gating pulses each timed to terminate prior to termination of their associated channel pulses, and one of the said push-pull amplifier transistors adapted to provide a path for the discharge of the common two-wire highway during the interval between termination of a second gating pulse and its associated channel pulse.

References Cited in the file of this patent

UNITED STATES PATENTS

| | | |
|---|---|---|
| 2,929,879 | Jacobaeus et al. | Mar. 22, 1960 |
| 2,962,551 | Johannesen | Nov. 29, 1960 |
| 2,962,552 | Crowley | Nov. 29, 1960 |